(12) United States Patent
Pertuit et al.

(10) Patent No.: US 8,736,560 B2
(45) Date of Patent: May 27, 2014

(54) ELECTRONIC DEVICE INCLUDING TACTILE TOUCH-SENSITIVE DISPLAY AND METHOD OF CONTROLLING SAME

(75) Inventors: Michael Joseph Pertuit, Irving, TX (US); Richard James Brogle, Irving, TX (US); Adam Louis Parco, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1048 days.

(21) Appl. No.: 12/780,437

(22) Filed: May 14, 2010

(65) Prior Publication Data

US 2011/0279382 A1  Nov. 17, 2011

(51) Int. Cl.
*G06F 3/041* (2006.01)

(52) U.S. Cl.
USPC .............. 345/173; 178/18.01; 178/19.01

(58) Field of Classification Search
CPC .............. G06F 3/016; G06F 2203/013; G06F 2203/014; G06F 2203/015; G06F 3/041
USPC .............. 345/173–178; 178/18.01–19.07
See application file for complete search history.

(56) References Cited

U.S. PATENT DOCUMENTS

2006/0028095 A1* 2/2006 Maruyama et al. ...... 310/316.01
2008/0088602 A1* 4/2008 Hotelling ...................... 345/173

OTHER PUBLICATIONS

Office Action mailed Mar. 4, 2013, in corresponding Canadian patent application No. 2,704,465.

* cited by examiner

*Primary Examiner* — Michael Pervan
(74) *Attorney, Agent, or Firm* — Steven M. Greenberg, Esq.; CRGO Law

(57) ABSTRACT

A method of controlling an electronic device having a touch-sensitive display includes determining a first value representative of force applied by an actuator to a touch-sensitive input device of an electronic device, controlling the actuator to modulate the force on the touch-sensitive input device for providing tactile feedback, determining a second value representative of force applied by the actuator to the touch-sensitive input device, and adjusting control of the actuator to adjust a subsequent force applied by the actuator based on a difference between the first value and the second value.

15 Claims, 5 Drawing Sheets

ELECTRONIC DEVICE INCLUDING TACTILE TOUCH-SENSITIVE DISPLAY AND METHOD OF CONTROLLING SAME

FIELD OF TECHNOLOGY

The present disclosure relates to portable electronic devices that include a touch-sensitive display and the provision of tactile feedback for such devices.

BACKGROUND

Electronic devices, including portable electronic devices, have gained widespread use and may provide a variety of functions including, for example, telephonic, electronic text messaging and other personal information manager (PIM) application functions. Portable electronic devices can include several types of devices including mobile stations such as cellular phones, smart phones, Personal Digital Assistants (PDAs), and laptop computers. Touch-sensitive input devices are useful for input on a portable electronic device.

Devices such as PDAs or smart phones are generally intended for handheld use and ease of portability. Smaller devices are generally desirable for portability. Touch screen devices constructed of a display, such as a liquid crystal display (LCD), with a touch-sensitive overlay are useful on such handheld devices as such handheld devices are small and are therefore limited in space available for user input and output devices. Further, the screen content on the touch screen devices can be modified depending on the functions and operations being performed.

Improvements in provision and control of tactile feedback in touch-sensitive devices are desirable.

BRIEF DESCRIPTION OF THE DRAWINGS

Embodiments of the present disclosure will now be described, by way of example only, with reference to the attached Figures, in which.

DETAILED DESCRIPTION

Figure 1:
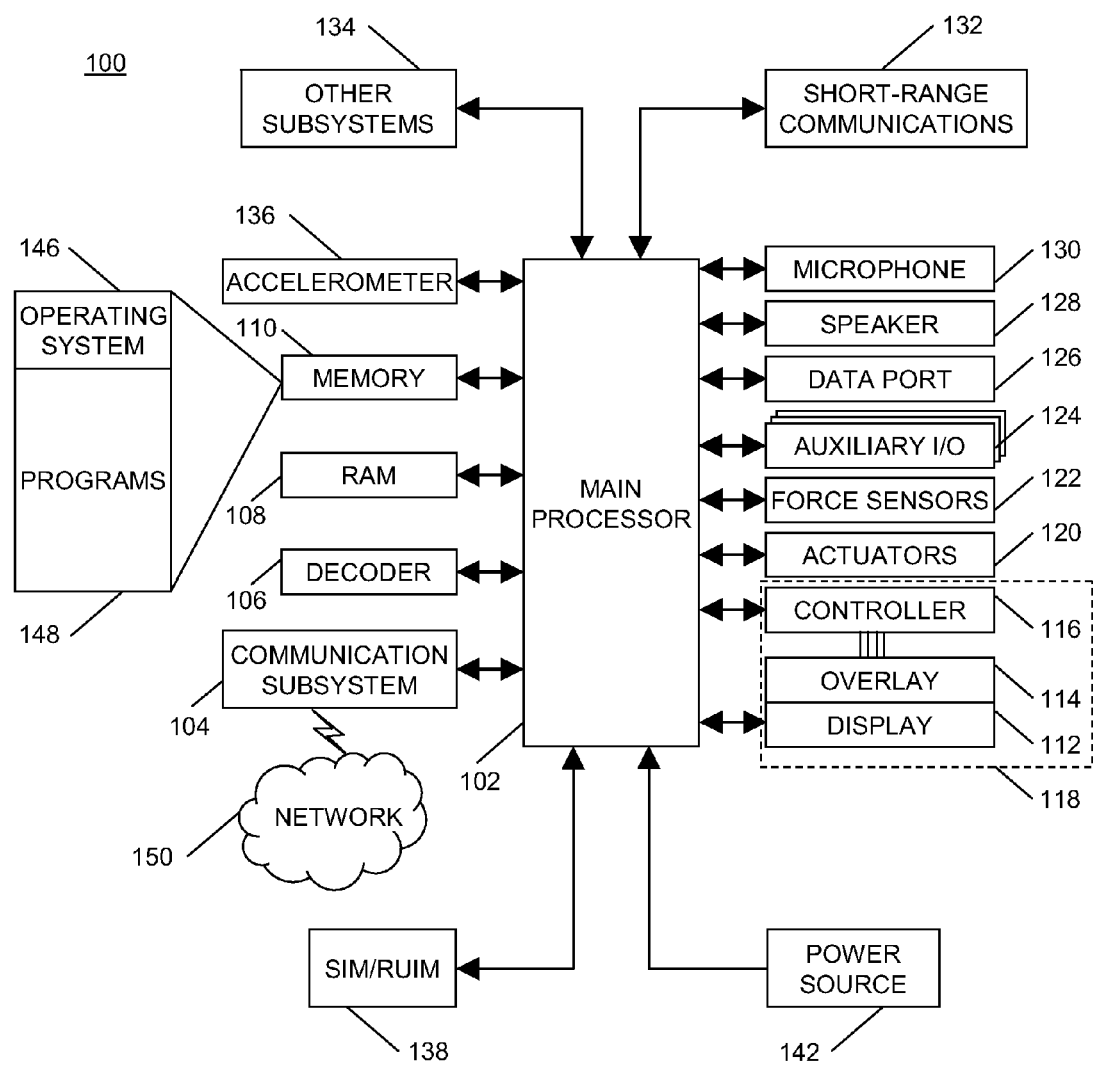
FIG. 1 is a block diagram of an example portable electronic device in accordance with the present disclosure.

A method of controlling an electronic device includes determining a first value representative of force applied by an actuator to a touch-sensitive input device of an electronic device, controlling the actuator to modulate the force on the touch-sensitive input device for providing tactile feedback, determining a second value representative of force applied by the actuator to the touch-sensitive input device, and adjusting control of the actuator to adjust a subsequent force applied by the actuator based on a difference between the first value and the second value.

For simplicity and clarity of illustration, reference numerals may be repeated among the figures to indicate corresponding or analogous elements. Numerous specific details are set forth to provide a thorough understanding of the embodiments described herein. The embodiments may be practiced without these specific details. In other instances, well-known methods, procedures, and components have not been described in detail so as not to obscure the embodiments described herein. The description is not to be considered as limited to the scope of the embodiments described herein.

The disclosure generally relates to an electronic device, which in the embodiments described herein is a portable electronic device. Examples of portable electronic devices include mobile, or handheld, wireless communication devices such as pagers, cellular phones, cellular smartphones, wireless organizers, personal digital assistants, wirelessly enabled notebook computers, and the like. The portable electronic device may also be a portable electronic device without wireless communication capabilities such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and dual-mode networks that support both voice and data communications. A power source 142, such as one or more rechargeable batteries or a port to another power supply, powers the portable electronic device 100.

The processor 102 interacts with other devices, such as a Random Access Memory (RAM) 108, memory 110, a display 112 with a touch-sensitive overlay 114 operably connected to an electronic controller 116 that together comprise a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, links, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into the memory 110.

The portable electronic device 100 also includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, or surface acoustic wave (SAW) touch-sensitive display, as known in the art. A capacitive touch-sensitive display includes the display 112 and a capacitive touch-sensitive overlay 114. The overlay 114 may be an assembly of multiple layers in a stack including, for example, a substrate, LCD display 112, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. The location of a detected touch may include x and y components, e.g., horizontal and vertical components, respectively, with respect to one's view of the touch-sensitive display 118. For example, the x location component may be determined by a signal generated from one touch sensor, and the y location component may be determined by a signal generated from another touch sensor. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. Multiple simultaneous touches may be detected.

The actuator 120 may be depressed by applying sufficient force to the touch-sensitive display 118 to overcome the actuation force of the actuator 120. The actuator 120 may be actuated by pressing anywhere on the touch-sensitive display 118. The actuator 120 may provide input to the processor 102 when actuated. Actuation of the actuator 120 provides the user with tactile feedback.

Figure 2:
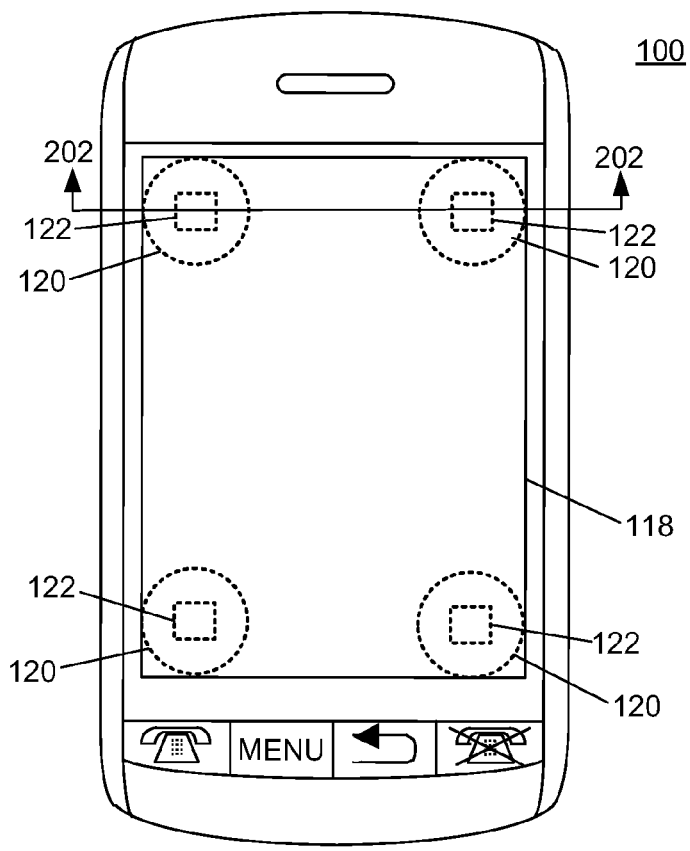
FIG. 2 is a front view of an example of a portable electronic device in accordance with the present disclosure.
Figure 3:
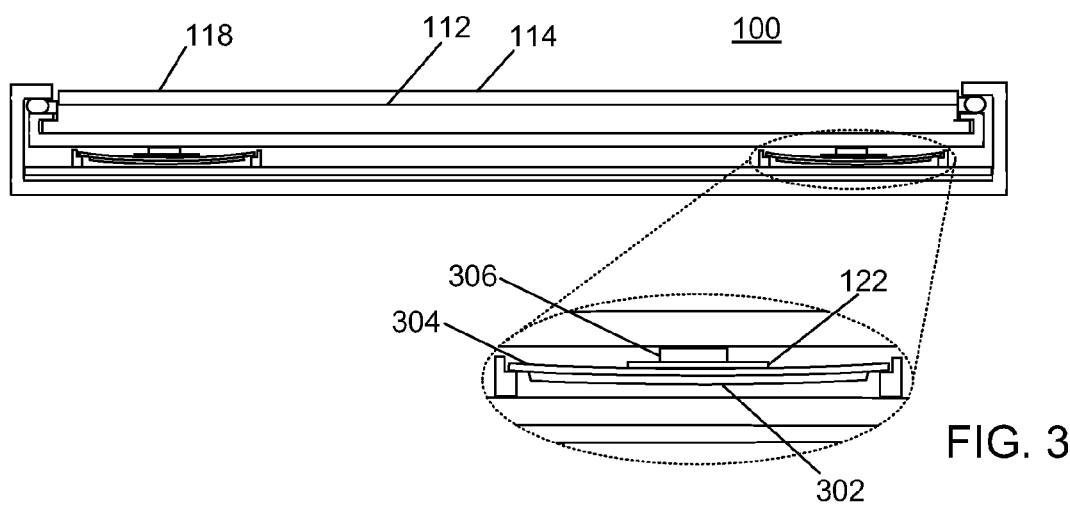
FIG. 3 is a sectional side view of the example portable electronic device through the line 202 of FIG. 2A, in accordance with the present disclosure.

The actuator 120 may comprise one or more piezoelectric (piezo) actuators that provide tactile feedback. FIG. 2 is front view of an example of a portable electronic device 100. In the example shown in FIG. 2, the actuator 120 comprises four piezo actuators 120, each located near a respective corner of the touch-sensitive display 118. FIG. 3 is a sectional side view of the portable electronic device 100 through the line 202 of FIG. 2. Each piezo actuator 120 is supported within the portable electronic device 100 such that contraction of the piezo actuators 120 applies a force against the touch-sensitive display 118, opposing a force externally applied to the display 118. Each piezo actuator 120 includes a piezoelectric device 302, such as a piezoelectric disk adhered to a substrate 304, such as a metal substrate. An element 306 that is advantageously at least partially flexible and comprises, for example, hard rubber may be located between the piezoelectric device 302 and the touch-sensitive display 118. The element 306 does not substantially dampen the force applied to or on the touch-sensitive display 118. In the example shown in FIG. 2 and FIG. 3, the force sensor 122 comprises four force sensors 122 located between the element 306 and the substrate 304. The force sensors 122 are utilized to determine a value related to the force at each of the force sensors 122 when an external force is applied to the touch-sensitive display 118. Each force sensor 122 may also be utilized to determine a value related to force, applied by a respective actuator 120, on the touch-sensitive display 118. The substrate 304 bends when the piezoelectric device 302 contracts diametrically due to build up of charge at the piezoelectric device 302 or in response to an external force applied to the touch-sensitive display 118. The charge may be adjusted by varying the applied voltage or current, thereby controlling the force applied by the piezo actuators 120 on the touch-sensitive display 118. The charge on the piezo actuators 120 may be removed by a controlled discharge current that causes the piezoelectric devices 302 to expand diametrically, decreasing the force applied by the piezo actuators 120 on the touch-sensitive display 118. Absent an external force applied to the touch-sensitive display 118 and absent a charge on the piezoelectric device 302, the piezo actuator 120 may be slightly bent due to a mechanical preload.

Figure 4:
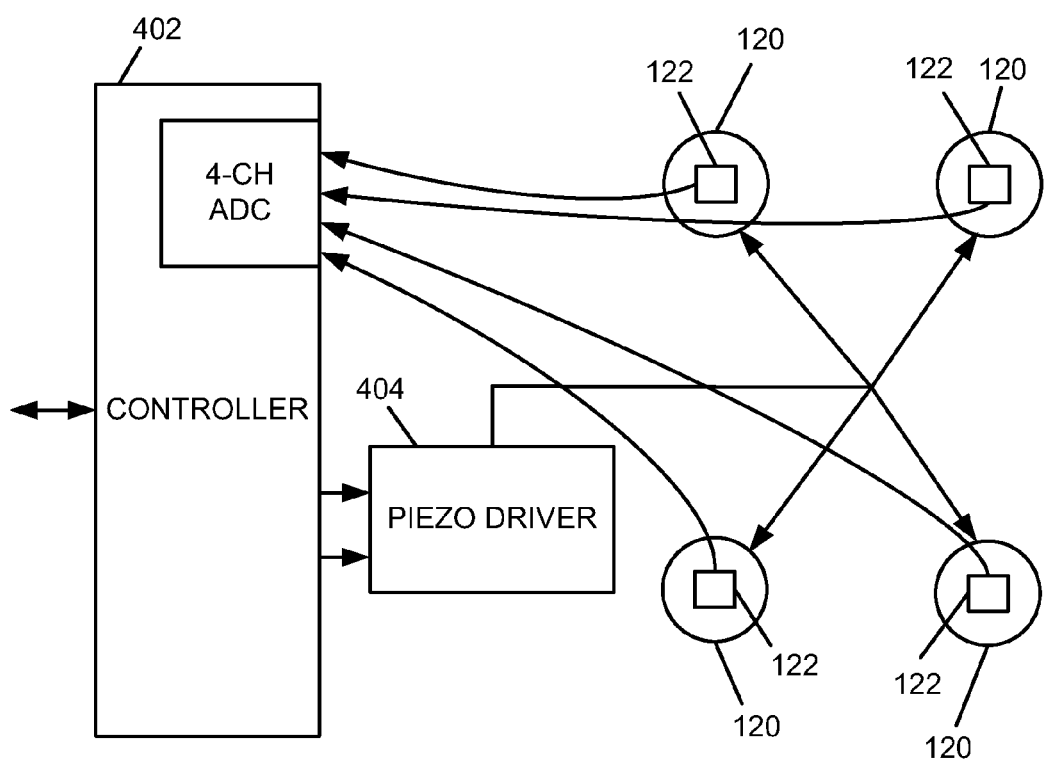
FIG. 4 is a functional block diagram showing components of the example portable electronic device in accordance with the present disclosure.

A functional block diagram of components of the portable electronic device 100 is shown in FIG. 4. In this example, each force sensor 122 is connected to a controller 402, which includes an amplifier and analog-to-digital converter (ADC). The force sensors 122 may be, for example, force-sensing resistors in an electrical circuit such that the resistance changes with force applied to the force sensors 122. As applied force on the touch-sensitive display 118 increases, the resistance decreases. This change is determined via the controller 116 for each of the force sensors 122, and a value representative of the force at each of the force sensors 122 is determined.

The piezo actuators 120 are connected to a piezo driver 404 that communicates with the controller 402. The controller 402 is also in communication with the main processor 102 of the portable electronic device 100 and may receive and provide signals to and from the main processor 102. The piezo actuators 120 and the force sensors 122 are operatively connected to the main processor 102 via the controller 402. The controller 402 controls the piezo driver 404 that controls the current/voltage to the piezoelectric devices 302 and thus controls the charge and the force applied by the piezo actuators 120 on the touch-sensitive display 118. Each of the piezoelectric devices 302 may be controlled substantially equally and concurrently. Optionally, the piezoelectric devices 302 may be controlled separately. Tactile feedback is provided by controlling the piezoelectric devices 302. For example, when an applied force on the touch-sensitive display 118 exceeds a depression threshold, the charge at the piezo actuators 120 is modulated to impart a force on the touch-sensitive display 118 to simulate depression of a dome switch. When the applied force, on the touch-sensitive display 118, falls below a release threshold, after simulation of depression of a dome switch, the charge at the piezo actuators 120 is modulated to impart a force, by the piezo actuators 120, to simulate release of a dome switch.

Figure 5:
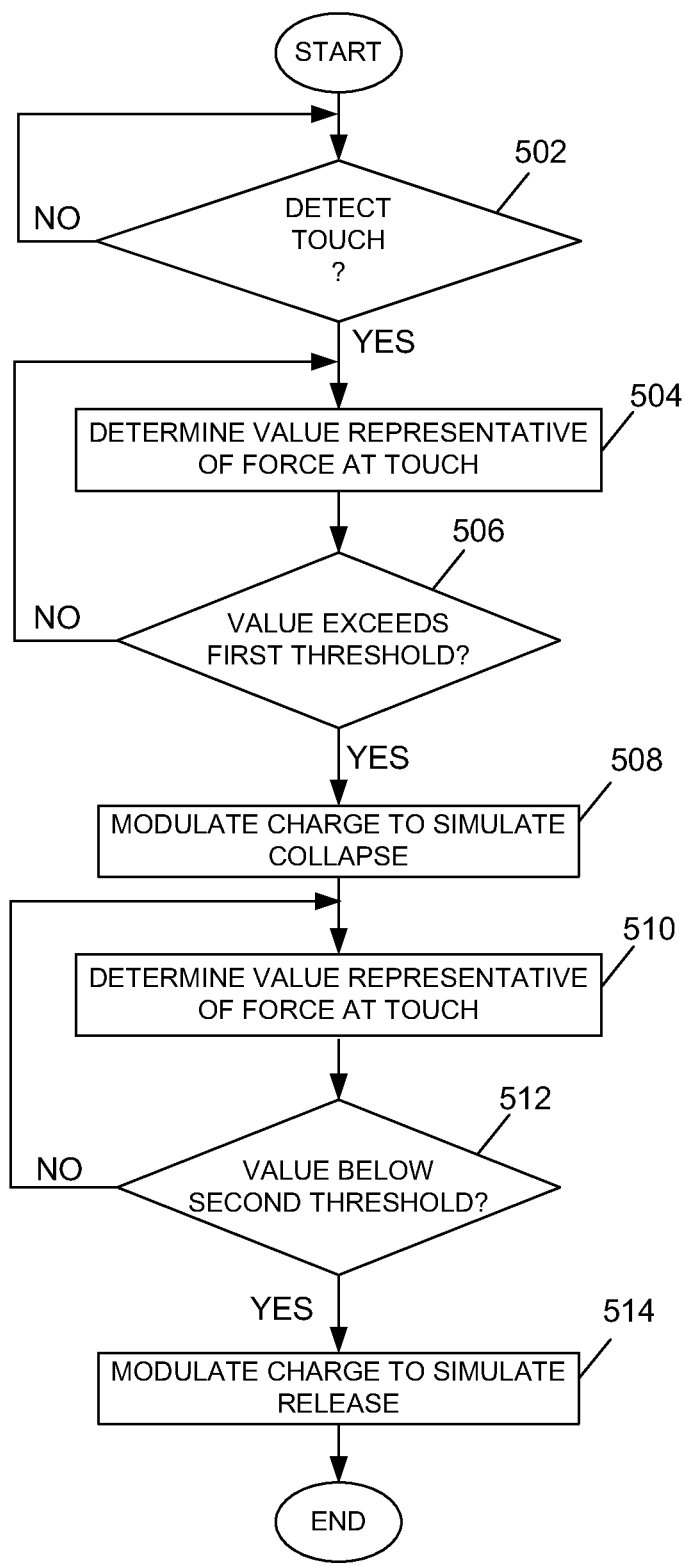
FIG. 5 is a flowchart illustrating a method of controlling a portable electronic device to provide tactile feedback in accordance with the present disclosure.

A flowchart illustrating a method of controlling the electronic device 100 is shown in FIG. 5. The method may be carried out by software executed by, for example, the processor 102 or the controller 402 or both the processor 102 and the controller 402. Coding of software for carrying out such a method is within the scope of a person of ordinary skill in the art given the present description.

When a touch is detected 502, the location of touch on the touch-sensitive display 118 is determined. A value representative of the force of the touch is determined 504 based on signals from the force sensors 122. When the value representative of the force of the touch is above a first threshold at 506, the charge at the piezo actuators 120 is modulated 508 to simulate collapse of a dome switch. When the value representative of the force of the touch is not above the first threshold at 506, the process continues at 504 to again determine the value representative of the force of the touch. After modulating the charge at the piezo actuators 120 at 508, the value representative of the force of the touch is determined 510 and when the value representative of the force has fallen below a second threshold at 512, the charge at the piezo actuators 120 is modulated 514 to simulate release of the dome switch. The second threshold is lower than the first threshold.

Figure 6:
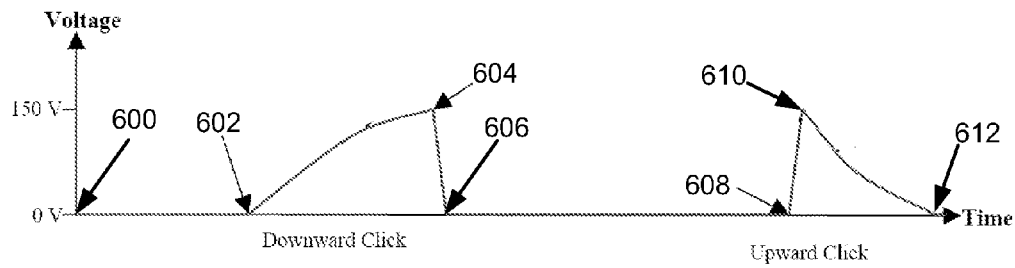
FIG. 6 is an example of a graph of voltage across a piezo actuator versus time during actuation in accordance with the present disclosure.

A simplified example of a graph of voltage across the piezoelectric devices 302 versus time is shown in FIG. 6. The voltage shown is the voltage across one of the piezoelectric devices 302, which is related to the charge. The touch is detected at 600. The externally applied force on the touch-sensitive display 118 exceeds the threshold at 602 and the charge at the piezoelectric device 302 is modulated between 602 and 604 to ramp up the charge over a period of time that is sufficiently long to inhibit user detection of the force. The charge on the piezoelectric device 302 is removed over a much shorter period of time relative to the period of time for ramp up to simulate the collapse of the dome switch between 604 and 606. When the externally applied force on the touch-sensitive display 118 falls below the low threshold, the charge at the piezoelectric device 302 is modulated to impart a force, by the piezo actuators 120, to increase the charge over a relatively short period of time to simulate release of a dome switch between 608 and 610. The charge on the piezoelectric device 302 is removed to reduce the applied force by the piezo actuators 120 over a longer period of time between 610 and 612.

The force applied by the piezo actuators 120 on the touch-sensitive display 118 may change over time and with use of the portable electronic device 100. Factors such as battery voltage and temperature may affect the force applied by the piezo actuators 120 on the touch-sensitive display 118, therefore changing the tactile feel. The force applied by the piezo actuators 120 may be adjusted during use of the device to compensate for changes by adjusting the applied voltage or current.

Figure 7:
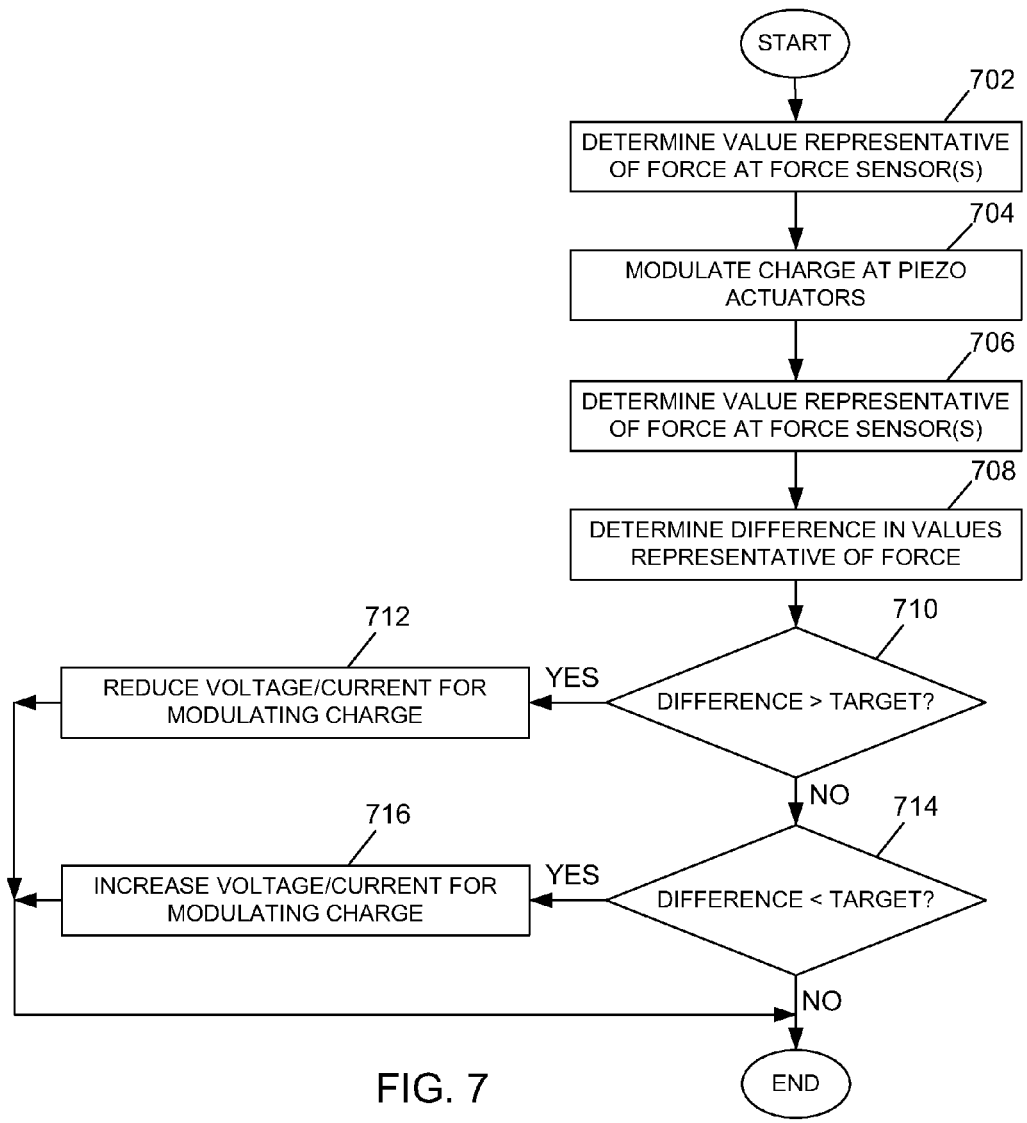
FIG. 7 is a flowchart illustrating a method of controlling an electronic in accordance with the present disclosure.

FIG. 7 is a flow chart illustrating a method of controlling the portable electronic device 100 to adjust the force applied by the piezo actuators 120. The method of FIG. 7 may be carried out by, for example, the processor 102 or the controller 402 or both the processor 102 and the controller 402 executing software from a computer-readable medium. Coding of software for carrying out such steps is well within the scope of a person of ordinary skill in the art given the present description.

The value representative of force at each of the force sensors is determined 702. The actuators are controlled 704 to modulate the force on the touch-sensitive display 118 and the value representative of force at each of the force sensors is determined 706. In the example of the piezoelectric devices 302, the value representative of force may be determined at 702 when the piezoelectric devices 302 are not charged and may be determined again at 706 when the piezoelectric devices 302 are at the peak of charge. Thus, referring to FIG. 6, the value representative of force may be determined at 602 and again at 604. Alternatively, the value representative of force may be determined at 702 when the piezoelectric devices 302 are charged and may be determined again at 706 after the piezoelectric devices 302 are discharged. Again referring to FIG. 6, the value representative of force may be determined at 604 and again 606. In still another alternative, the values representative of forces may be determined during simulation of release of a dome switch.

The difference between the value representative of force determined at 702 and the value representative of force determined at 706 is determined 708 for each force sensor 122 and therefore the difference between the minimum value representative of force and maximum value representative of force is determined for each force sensor 122.

Each difference in values representative of force that is determined at 708 is compared to a target value. When a determination is made 710 that the difference is greater than the target value, the voltage or current for modulating the charge at the piezo actuators 120 is reduced 712 so that the peak charge is reduced, thereby reducing the maximum force for a subsequent touch. The reduction in applied voltage or current at 712 may be related to the difference between the target value and the difference in values representative of force. Thus, a greater difference results in a greater reduction in applied voltage or current. Alternatively, the reduction may be a preset increment. When a determination is made 714 that the difference is less than the target value, the voltage or current for modulating the charge at the piezo actuators 120 is increased 716 so that the peak charge is increased, thereby increasing the maximum force applied by the piezo actuators 120 for a subsequent touch. The increase in applied voltage or current at 716 may be related to the difference between the target value and the difference in values representative of force. Thus, a greater difference results in a greater reduction in applied voltage or current. Alternatively, the increase may be a preset increment.

The actuators are controlled by modulating the charge at the piezoelectric devices 302, utilizing the applied voltage or current. The voltage or current may be reduced for the ramp up and discharge during simulation of collapse of the dome switch, for example, by reducing the peak charge at the piezo actuators 120 and the ramp-up slope without changing ramp up time or the discharge time. The voltage or current may also be reduced for the charge up and ramp down during simulation of release of the dome switch without changing the charge up time. The voltage or current may be increased, for the ramp up and discharge during simulation of collapse of the dome switch, for example, by increasing the peak charge at the piezo actuators 120 and the ramp-up slope, without changing the ramp up time or the discharge time. The voltage or current may also be increased, for the charge up and ramp down during simulation of release of the dome switch, without changing the charge up time.

The values representative of force as determined at 702 and 706 may include an applied force from a touch on the touch-sensitive display 118. The applied force may generally be subtracted out by determining the difference in values representative of force The target value may be pre-set during manufacture of the portable electronic device 100 or may be selectable to provide a desired tactile feedback. The applied voltage or current is adjusted based on the force applied by the piezo actuators 120 on the touch-sensitive display 118, facilitating the provision of generally consistent tactile feedback.

In the example described above with reference to FIG. 7, the forces applied by the piezo actuators 604 are determined during tactile feedback to simulate collapse and release of a dome switch when a touch is received on the touch-sensitive display 118. The forces applied by the piezo actuators 604 may also be determined, for example, during a vibration notification at the portable electronic device 100, when the piezo actuators 120 are also utilized to provide vibration. In this case, the force applied by the piezo actuators 120 may be determined utilizing the force sensors 122. The target value for vibration may be different than for simulation of collapse and release of a dome switch. Forces applied by the piezo actuators 120 for vibration may be adjusted in a similar manner using the different target force.

Advantageously, the force applied by the piezo actuators 120 on the touch-sensitive display 118 may be adjusted by adjusting the applied voltage or current to compensate for changes over time and with use of the portable electronic device 100. Factors such as battery voltage and temperature, that may change the force applied to the touch-sensitive display, may be compensated for to provide desirable tactile feedback or confirming receipt of input to the user. This provides a positive, desirable response and reduces the chance of input errors such as double entry, decreasing use time and increasing user-satisfaction.

According to one aspect, a method of controlling an electronic device that has a touch-sensitive display is provided. The method includes determining a first value representative of force applied by an actuator to a touch-sensitive input device of an electronic device, controlling the actuator to modulate the force on the touch-sensitive input device for providing tactile feedback, determining a second value representative of force applied by the actuator to the touch-sensitive input device, and adjusting control of the actuator to adjust a subsequent force applied by the actuator based on a difference between the first value and the second value.

According to another aspect, a computer-readable medium has computer-readable code embodied therein for execution by at least one processor in an electronic device to cause the electronic device to carry out the above method.

According to another aspect, an electronic device includes a base, a touch-sensitive display moveable relative to the base, an actuator arranged to modulate a force on the touch-sensitive display, a force sensor arranged to determine values of force, applied by the actuator, on the touch-sensitive display, and a processor operably coupled to the touch-sensitive display, the actuator and the force sensor to determine a first value representative of force applied by the actuator to the touch-sensitive display, control the actuator to modulate the force on the touch-sensitive display, determine a second value representative of force applied by the actuator to the touch-sensitive display, and adjust control of the actuator to adjust a subsequent force applied by the actuator based on a difference between the first value and the second value.

While the embodiments described herein are directed to particular implementations of the portable electronic device and the method of controlling the portable electronic device, it will be understood that modifications and variations may occur to those skilled in the art. All such modifications and variations are believed to be within the sphere and scope of the present disclosure.

What is claimed is:

1. A method of controlling an electronic device having a touch-sensitive display, the method comprising:

determining a first value representative of force applied by an actuator to a touch-sensitive input device of an electronic device;

controlling the actuator to modulate the force on the touch-sensitive input device for providing tactile feedback;

determining a second value representative of force applied by the actuator to the touch-sensitive input device;

adjusting control of the actuator to adjust a subsequent force applied by the actuator based on a difference between the first value and the second value.

2. The method according to claim 1, comprising comparing the difference to a target value prior to adjusting and wherein adjusting comprises adjusting based on the comparison.

3. The method according to claim 1, wherein determining the first value, controlling the actuator, determining the second value, and adjusting control are carried out for each of a plurality of actuators.

4. The method according to claim 1, wherein determining the force applied by the actuator comprises determining based on signals from a force sensor.

5. The method according to claim 4, wherein the force sensor comprises a force sensing resistor.

6. The method according to claim 4, wherein determining the first value and determining the second value comprises determining, utilizing the force sensor, first and second values of force that include force applied by the actuator and an external applied force.

7. The method according to claim 1, wherein one of determining the first value representative of force and determining the second value representative of force comprises determining a maximum value representative of force applied by the actuator.

8. The method according to claim 1, wherein the actuator comprises a piezo actuator and controlling the actuator comprises controlling a charge at the actuator to modulate the force.

9. The method according to claim 8, wherein determining the first value comprises determining a value representative of force absent a charge at the actuator and determining a second value comprises determining a maximum value representative of force.

10. The method according to claim 8, wherein determining the first value comprises determining a maximum value representative of force and determining a second value comprises determining a value representative of force absent a charge at the actuator.

11. The method according to claim 8, wherein adjusting the subsequent force comprises one of adjusting an applied voltage and adjusting a current to adjust the charge.

12. The method according to claim 10, wherein adjusting control comprises decreasing a charge when the difference between the first value and the second value is greater than the target.

13. The method according to claim 10, wherein adjusting control comprises increasing a charge when the difference between the first value and the second value is less than the target.

14. A persistent, updateable computer-readable memory having stored therein computer-readable code embodied therein for execution by at least one processor in an electronic device to carry out the method of claim 1.

15. An electronic device comprising:
a base;
a touch-sensitive display moveable relative to the base;
an actuator arranged to modulate a force on the touch-sensitive display;

a force sensor arranged to determine values of force, applied by the actuator, on the touch-sensitive display;

a processor operably coupled to the touch-sensitive display, the actuator and the force sensor to determine a first value representative of force applied by the actuator to the touch-sensitive display, control the actuator to modulate the force on the touch-sensitive display, determine a second value representative of force applied by the actuator to the touch-sensitive display, and adjust control of the actuator to adjust a subsequent force applied by the actuator based on a difference between the first value and the second value.

* * * * *